(12) United States Patent
Kuvettu et al.

(10) Patent No.: US 6,284,218 B1
(45) Date of Patent: Sep. 4, 2001

(54) PROCESS FOR PREPARING AN HYDROTHERMALLY STABLE, LARGE CRYSTALLITE SIZED, HIGHLY CRYSTALLITE SIZED, HIGHLY CRYSTALLINE SYNTHETIC FAUJASITE ZEOLITE

(75) Inventors: Mohan Prabhu Kuvettu; Manoranjan Santra; Venkatachalam Krishnan, all of Faridabad; Sanjay Kumar Ray, New Delhi; Christopher J, Faridabad; Ganga Shanker Mishra, Faridabad; Ram Mohan Thakur, Faridabad; Satish Makhija, New Delhi; Soban Ghosh, Faridabad, all of (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 09/158,817

(22) Filed: Sep. 23, 1998

(51) Int. Cl.$^7$ ...................................................... C01B 39/20
(52) U.S. Cl. .................................. 423/709; 423/DIG. 21; 502/79
(58) Field of Search ............................ 423/709, DIG. 21; 502/79

(56) References Cited

U.S. PATENT DOCUMENTS

| | | | | |
|---|---|---|---|---|
| 3,130,007 | * | 4/1964 | Breck . | |
| 3,639,099 | * | 2/1972 | Elliott et al. . | |
| 3,671,191 | * | 6/1972 | Maher et al. | 423/709 |
| 3,789,107 | * | 1/1974 | Elliott | 423/DIG. 21 |
| 3,808,326 | * | 4/1974 | McDaniel et al. | 423/709 |
| 3,867,307 | * | 2/1975 | Scherzer et al. | 502/73 |
| 4,085,069 | * | 4/1978 | Alafandi et al. | 502/79 |
| 4,175,059 | * | 11/1979 | Edwards et al. | 423/DIG. 21 |
| 4,333,859 | * | 6/1982 | Vaughan et al. | 423/DIG. 21 |
| 4,631,262 | * | 12/1986 | Altomare et al. | 423/709 |
| 4,678,651 | * | 7/1987 | Miyazaki et al. | 423/709 |
| 4,925,613 | * | 5/1990 | Harada et al. | 423/709 |
| 5,234,876 | * | 8/1993 | Swaroop et al. | 502/79 |

* cited by examiner

*Primary Examiner*—David R Sample
(74) *Attorney, Agent, or Firm*—Venable; George H. Spencer; Ashley J. Wells

(57) ABSTRACT

A synthetic faujasite zeolite and a process for preparing the same which includes forming a reaction mixture consisting essentially of water, a source of silica, a source of alumina, $Na_2O$ nd nucleation centers, wherein the reaction mixture has molar ratios of constituents including $Na_2O/SiO_2$, 0.4–0.9; $SiO_2/Al_2O_3$, 7–13; and $H_2O/Na_2O$, 30–45, and wherein the nucleation centers have molar ratios of constituents including $Na_2O/SiO_2$, 0.5–2.0; $SiO_2/Al_2O_3$, 10–20; and $H_2O/Na_2O$, 10–40; and heating the reaction mixture to a temperature ranging from 90 to 110° C. for a time period ranging from 23 to 29 hours to obtain the synthetic faujasite zeolite, wherein the synthetic faujasite zeolite has a crystallite size ranging from 1500 to 2000 Å, a particle size ranging from 4000 to 8000 Å, and a retention of surface of more than 70% of that of a parent zeolite, when exchanged with ammonia and subjected to hydrothermal treatment at 650° C. for 3 hours and with 100% steam.

6 Claims, 1 Drawing Sheet

PROCESS FOR PREPARING AN HYDROTHERMALLY STABLE, LARGE CRYSTALLITE SIZED, HIGHLY CRYSTALLITE SIZED, HIGHLY CRYSTALLINE SYNTHETIC FAUJASITE ZEOLITE

BACKGROUND OF THE INVENTION

1. Field of the Invention

The present invention relates to the preparation of a synthetic faujasite zeolite. More specifically, the present invention relates to a method of producing highly crystalline, defect free, hydrothermally stable zeolite which has a crystallite size of 1500–2000 Å and which is suitable for gas oil cracking.

2. Description of the Related Art

Synthetic faujasite zeolites or crystalline aluminco-silicate zeolites commonly known as molecular sieves are characterised by a very highly ordered crystalline structure. This involves a three dimensional framework of $AlO_4$ and $SiO_4$ tetrahedra which are cross linked by the sharing of oxygen atoms. The electrovalency of each tetrahedron containing aluminum is balanced by the presence of a cation such as an alkali metal ion. The void spaces in the framework are occupied by water molecules. The chemical formula for a faujasite zeolite given in U.S. Pat. No. 3,130,007 is as follows: $0.9 +/-0.2\ Na_2O: Al_2O_3: w\ SiO_2: x\ H_2O$, where w has a value of greater that 2.5 and up to 6, and x may have a value as high as 9. Synthetic faujasite zeolite, also known as Sodium Y zeolite, has been in use as a key component of a Fluid Catalyst Cracking (FCC) catalyst for over past 30 years. Attempts have been made to synthesise a large pore zeolite to replace the Sodium Y zeolite for a FCC catalyst, but these have failed to meet stringent hydrothermal stability requirements. Efforts to improve hydrothermal stability of Y zeolites have led to the development of ultrastable Y zeolite (USY), but the process of ultrastabilisation is expensive. The other drawbacks of USY zeolites are that nonframework alumina produces undesirable coke and gas, ultrastabilisation by diaminohexafluorosilicate causes a reagent effluent problem and finally USY zeolite have aluminium depleted surfaces resulting in a loss catalytic activity.

In the FCC process, in which the feed contains a wide range of molecular sizes and types, some reactions will take place on the surface and others inside the zeolite crystal. In the prior art, attention has been focused to increasing surface to volume ratio of a Y zeolite by reducing crystal sizes by manipulation of synthesis conditions. European patent NO. EP 02423GA2 describes preparation of a type zeolite having smaller than conventional particle size which, when formulated into a FCC catalyst exhibits improved product selectivity. Since most samples of zeolite are agglomerates with a rock pile morphology, crystallite size is not the same as particle size. Particle size and crystallite size are the same only if atoms are stacked linearly in all three dimensions continuing up to the crystal surface. It is well known from various publications that smaller sized zeolite crystals have abnormally rapid deactivation rate in the presence of steam probably reflecting the preferential dealuminaticin of the surface or destruction of the crystal lattice by high rates of surface hydrolysis.

This problem was addressed in the prior art by increasing the Si/Al ratio through ultrastabilistation which, in itself, is an expensive process. Defects such as stacking faults, screw defects, presence of impurity, and amorphous material in the zeolite are the major causes for their poor hydrothermal stability. Grain size or crystallite size has a direct correspondence to stacking faults. Two crystallities or grains are separated by a boundary called a grain boundary where linearity of atomic arrangement is interrupted.

Grain boundaries are considered basically as structrual defects, along which some atomic planes get terminated. At the line of termination, covalent bonds between atoms are strained. At this point, lattice atoms can be easily removed at high temperature in the presence of steam or acid, thereby losing a significant amount of crystallinity. With decreased average crystallite size, total length of the grain boundary increases, as shown in FIG. 1 of the accompanying drawings, which makes the crystals more fragile.

An object of this invention is to propose a process for the preparation of synthetic faujasite zeolite having a larger crystallite or grain size in comparison to that of the known art.

Still another object of this invention is to propose a process for the preparation of synthetic faujasite zeolite having a reduced total length of grain boundary.

Yet another object of this invention is to propose a process for the preparation of synthetic faujasite zeolite which exhibits improved hydrothermal stability, activity and metal tolerance.

SUMMARY OF THE INVENTION

According to the present invention, there is provided a process for preparing hydrothermally stable, metal tolerant, highly crystalline NaY zeolite wherein nucleation centers are combined with a gel mixture containing a Source of silica, a source of alumina and alkali a) in the molar ratios of:

| | |
|---|---|
| $Na_2O/SiO_2$ | 0.4–0.9 |
| $SiO_2/Al_2O_3$ | 7–13 |
| $H_2O/Na_2O$ | 30–45 | b) adding to th e said reaction mixture alumino-silicate zeolite nucleation centers having a composition:

| | |
|---|---|
| $Na_2O/SiO_2$ | 0.5–2.0 |
| $SiO_2/Al_2O_3$ | 10–20 |
| $H_2O/Na_2O$ | 10–40, and | c) heating the reaction mixture to a temperature of 9–110° C. for a period of 23–29 hours to get a faujasite type zeolite.

In accordance with this invention a highly crystalline zeolite is produced with large crystallite size which ensures higher hydrothermal stability. The crystallite size (t) in nm was determined by the Scherrer equation, $$t = \frac{0.9\lambda}{B\text{CoS}\theta},$$

where
- $\lambda$—wave length of X-ray radiation
- $\beta$—half height peak width, and
- $\phi$—peak position

DESCRIPTION OF THE REFERRED EMBODIMENTS

Figure 1A:
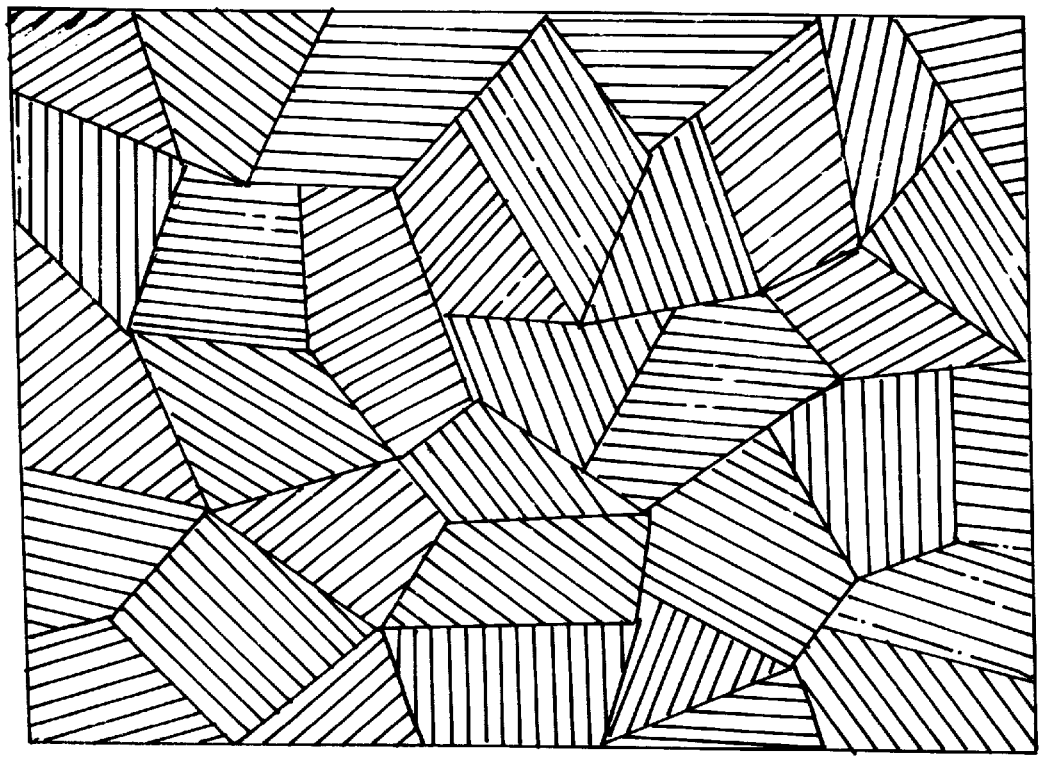
FIGS. 1a and 1b are schematic diagram of two zeolites having different crystallite/grain size, in which the grain size of FIG. 1a is small and the grain size of FIG. 1b is large.
Figure 1B:
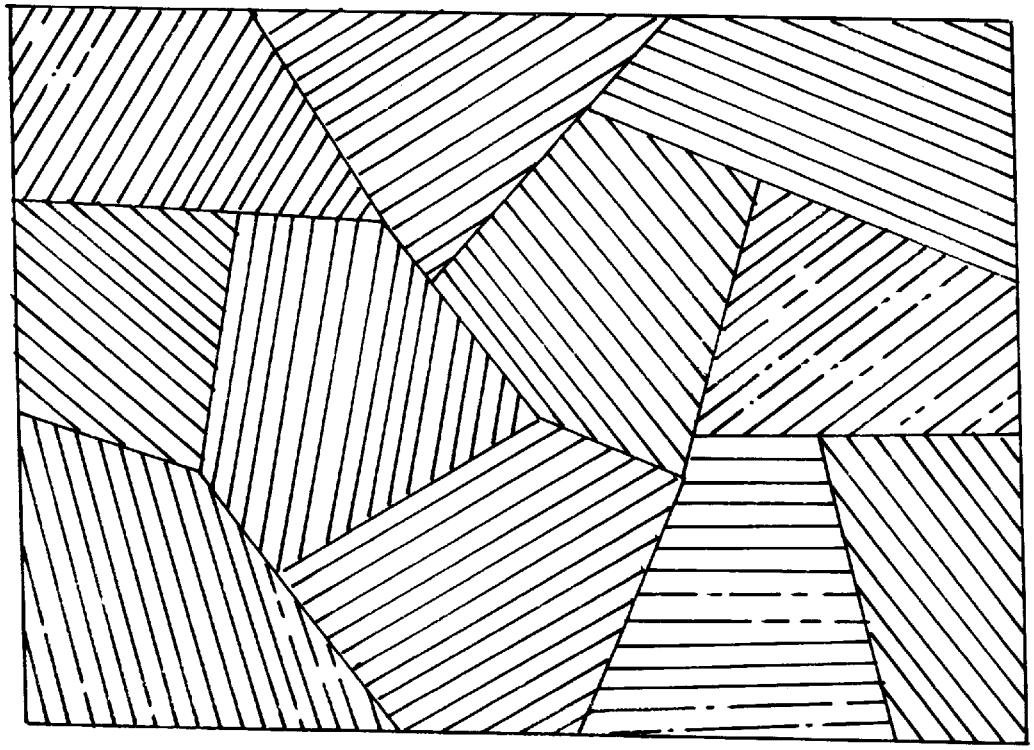

Our present invention contemplates a novel form of hydrothermally stable Y zeolite having crystallite size in the range of 1500–2000Å developed at the synthesis stage itself.

More specifically, we have found that a novel, hydrothermally stable and useful form of Y zeolite may be obtained by controlling a reaction mixture of conventional and commercial grade raw materials, e.g., sodium silicate, sodium aluminate and sodium hydroxide and water combined with silica alumina nucleation centers (seed) and reacting at elevated temperatures.

In a preferred practice of the present invention, reaction mixture ratios (molar) are selected to yield the novel faujasite type zeolite having silica to alumina ratios which fall with in the ranges generally specified for type Y zeolites. Accordingly, to obtain the novel faujasite type zeolite having either low or high silica to alumina ratio the following reaction mixture is selected.

| | |
|---|---|
| $Na_2O/SiO_2$ | 0.4–0.9, |
| $SiO_2/Al_2O_3$ | 7–13; and |
| $H_2O/Na_2O$ | 30–45, |

The above mentioned reaction mixture includes from 1.0 to 10 weight percent of silica alumina nucleation centers which have the following composition ratios:

| | |
|---|---|
| $Na_2O/SiO_2$ | 0.5–2.0, |
| $SiO_2/Al_2O_3$ | 10–20 and |
| $H_2O/Na_2O$ | 10–40. |

The faujasite zeolites are prepared in sodium form. The silicate employed is a commercially available sodium silicate having a $SiO_2$ to $Na_2O$ mole ratio of 2:1 to 3:1. This silicate is diluted with water when necessary, to provide a silicate solution having the desired concentration. The next step in the process involves adding nucleation centers to the precursor mixture. The seeding method is advantageous in that, it decreases the aging time necessary for the formation of the zeolite The nucleation centers are small particles that may be either amorphous or crystalline.

The method of preparation of seed comprises mixing solutions of sodium aluminate, sodium silicate and sodium hydroxide in the desired proportions. These solutions are then cooled and aged. Seeds are normally added in an amount from 0.1 to 10 wt % based on the weight of the final theoretical yield of the zeolite product. The mixing procedure used in combining seeds with the precursor mixture should be one which results in a rapid and thorough dispersion of the seeds throughout the mixture.

The slurry of precursor mixture and seed is held at temperatures of 98–110° C. until crystallisation completes, generally for a period of 23–29 hours. Subsequent to the reaction, the resultant crystalline product is recovered by filtration. The recovered product is preferably washed to remove excess reactants and subsequently dried.

All the product crystallites were larger than the conventional ones. The surface area of the zeolite samples was found to be 750–800m²/g, crystallinity 98–103%, and crystallite size 1500–2000 Å.

The novel faujasite product of the present invention has crystallinity of more than 97% and has retention of more than 70% of surface area when subjected to severe hydrothermal treatment at 650° C. for 3 hours and 100% steam and may be used to prepare catalyst compositions for gas oil cracking. The zeolite is hydrothermally more stable and it will be more effective in catalytic cracking than conventional low crystallite sized zeolites. Metal tolerance and high crystallinity, are other factors for improved catalyst performance.

Our invention is further illustrated by the following specific but non limiting examples:

EXAMPLE 1

This example illustrates the process of preparing nucleation centers. 102 gms of water glass (16.4% $Na_2O$, 35.60% $SiO_2$, 48.0% $H_2O$) were diluted with 104 gms of Demineralised (DM) water. To this, a solution containing 9.76 gms sodium aluminate (24.23% $Na_2O$, 43.93% $Al_2O_3$, 31.84% $H_2O$) dissolved in 80 gms of water and 25.68 gms sodium hydroxide (77.5% $Na_2O$, 22.5% $H_2O$) were added drop wise with stirring. Stirring continued for 5 minutes. The mixture was aged for 23 hours at 31–35° C. At the end the slurry was ready for use.

EXAMPLE 2

This example illustrates the process of preparing hydrothermally stable novel faujasite zeolite of the present invention. 1368 gms of water glass (16.4% $Na_2O$, 35.60% $SiO_2$, 48.0% $H_2O$) were diluted with 480 gms water. To this, sodium hydroxide solution prepared by dissolving 100 gms sodium hydroxide pellets ( 77.5% $Na_2O$, 22.5% $H_2O$) in 400 gms water was added under stirring. A solution containing 504 gms hydrated aluminum sulfate $Al_2(SO_4)_3$, 16 $H_2O$ (16.17% $Al_2O_3$) dissolved in 1000 gms water was added drop wise to the water glass-alkali solution with constant stirring. To this mixture, the seed prepared in example 1 was added slowly with stirring. The mixture was then held at 103° C. for 23 hours. The product was washed with boiling DM water till the pH of the filtrate came down to 9, and we dried at 110° C. for 16 hours.

The crystallinity of the product was 103%, surface area 759 m/g, crystallite size 1791 Å, unit cell size (UCS) 24.67 Å, particle size 0.4–0.8 microns and silica ti alumina ratio 5.3.

EXAMPLE 3

In this example, faujasite zeolite was synthesized as per the prior art procedure of U.S. Pat. No. 3,639,099. At the end of crystallization, the product was washed with the same procedure explained in example 2. The crystallinity of the products was 101% UCS 24.69 Å, surface area 750 m /g, particle size 0.1–4 microns, crystallite size 1070 Å and silica alumina ratio 5.0.

EXAMPLE 4

This example illustrates the hydrothermal stability studies conducted on zeolite prepared as per the process of the present invention.

The zeolites prepared in examples 2 and 3 were dispersed in boiling DM water to remove soluble sodium salts, the filter cake was dispersed in 5% ammonium sulfate solution with a solid to liquid ratio of 1:10, and the exchanged was carried cut twice, each time with fresh solution at 85–90° C., for 30 minutes. The exchanged cake was washed with DM water to remove sulfate ions. The cake was oven dried at 110° C. for 16 hours and calcined at 450° C. for one hour. The calcined zeolite was exchanged twice with 5% ammonium sulphate solution and washed till anion free. The sample was dried at 110° C. for 16 hours. The samples were then subjected to hydrothermal treatment in a steaming furnace at 650° C. for three hours with 100% steam. The steamed zeolites were characterised for physicochemical properties. Table 1 shows the effect of crystallite size on hydrothermal stability of zeolites in terms of surface area retention with respect to the parent zeolite which was not subjected to hydrothermal treatment.

TABLE 1

Effect of zeolite crystallite size on hydrothermal stability of ammonium exchanged zeolites*

| ZEOLITE SAMPLES | CRYSTALLITE SIZE °A | % SURFACE AREA RETENTION |
|---|---|---|
| EXP. 2 | 1791 | 79.00 |
| EXP. 3 | 1070 | 59.50 |

EXAMPLE 5

This example demonstrates that Fluid C:racking Catalyst (FCC) made from zeolites having large crystallite size prepared by the process of this invention is more active than that of catalyst made from Y zeolites having low crystallite size. 1000 gms of a Fluid Cracking Catalyst was prepared containing 25 wt % of the zeolites made as per the process if the present invention in examples 2 and 3. The zeolites were incorporated in an inorganic oxide matrix of silica and alumina. Kaolin clay was used as filler. The catalysts were tested in Micro Activity Test Unit by ASTM method after steam deactivation at 788° C. for 3 hours, with a catalyst to oil ratio 3.75 and a WHSV of 16. The feed obtained from Indian Oil Corporation, India, was Bombay high VGO of 370–400° C. cut, it and was converted into gasoline, coke and other products. The results are given in table 2. This test shows the cracking catalyst made from larger crystallite sized zeolite is more active than catalyst made from low crystallite sized zeolite.

TABLE 2

Performance of catalysts made from zeolites with different crystallite sizes.

| WT % | FCC CATALYST WITH LARGER SIZED ZEOLITE AS PER EXPERIMENT NO. 2 | FCC CATALYST WITH SMALLER CRYSTALLITE SIZED ZEOLITE AS PER EXPERIMENT NO. 3 |
|---|---|---|
| MATCONV | 65.02 | 63.80 |
| COKE | 1.665 | 2.00 |
| H2 | 0.006 | 0.0007 |
| DG | 0.46 | 0.90 |
| LPG | 18.33 | 15.60 |
| GASOLINE | 32.43 | 33.31 |
| HN | 12.13 | 12.59 |
| LCO | 27.34 | 27.50 |
| TCO | 39.47 | 40.09 |
| CLO | 7.64 | 8.51 |

ASTM conditions, IOC standard feed. DG-dry gas, LPG-liquefied petroleum gas, HN-heavy naphtha, LCO light cycle oil, TCO-total cycle oil, CLO-clarified oil.

EXAMPLE 6

This example demonstrates the hydrothermal stability of FCC catalyst using zeolite having larger crystallite size prepared as per the process of this invention.

FCC catalyst prepared by the method if example 5 using large and small crystallite sized zeolite samples was subjected to hydrothermal treatment at 788° C. for 3 hours under 100% steam. The results on retention of crystallinity and surface area if the catalysts are shown in table 3. It is seen that catalysts prepared using zeolite having large crystallite size is more stable compared to the one prepared from low crystallite sized zeolite

TABLE 3

Effect of crystallite size on hydrothermal stability of FCC catalysts

| | | FCC CATALYST | |
|---|---|---|---|
| SAMPLE | ZEOLITE CRYSTALLITE SIZE° A | % SURFACE AREA RETENTION | % CRYSTALLINITY RETENTION |
| EXP. 2 | 1791 | 54.55 | 68.93 |
| EXP. 3 | 1070 | 41.15 | 57.89 |

EXAMPLE 7

This example illustrates an improved metal tolerance property due to higher retention of surface area and crystallinity of FCC catalyst using larger crystallite sized zeolite prepared as per the process of this invention. FCC catalyst prepared by using zeolites of example 2 and 3 were at first given shock treatment by introducing them into a heated oven at 550° C. for one hour. The samples were then dispersed in vanadium (V)and nickel (Ni)sulphonate solutions in order to dope 1500 ppm of Ni and 2000 ppm of V. The catalysts were then subjected to hydrothermal deactivation at 788° C. for three hours and properties including crystallinity and sur face area were measured. The results are given in table 4.

TABLE 4

Effect of crystallite size on metal tolerance properties of FCC Catalysts.

| | | RETENTION OF FCC CATALYST | |
|---|---|---|---|
| SAMPLE | ZEOLITE CRYSTALLITE SIZE, ° A | SURFACE AREA ON METAL DOPING, % | CRYSTALLINITY ON METAL DOPING, % |
| EXP. 2 | 1791 | 47.11 | 59.89 |
| EXP. 3 | 1070 | 28.10 | 38.95 |

EXAMPLE 8

This example illustrates improvement in metal tolerance of an FCC catalyst prepared with high crystallite size zeolites. This example is similar to that of example 7 with the exception that the metal doped catalysts were tested with a Micro Activity Test (MAT) unit by ASTM method as in example 5. The results are given in Table 5. It is seen that the FCC catalyst containing larger crystallite sized zeolite retains 89% of its activity, whereas the FCC catalyst prepared with smaller zeolite retains only 63% of its activity.

TABLE 5

Effect of crystallite size on MAT activity of FCC catalysts.

| SAMPLE | ZEOLITE CRYSTALLITE SIZE, °A | RETENTION OF FCC CATALYST MAT ACTIVITY % |
|---|---|---|
| EXP 2 | 1791 | 89 |
| EXP 3 | 1070 | 63 |

What is claimed is:

1. A process for preparing a synthetic faujasite zeolite, comprising:

a) forming a reaction mixture consisting essentially of water, a source of silica, a source of alumina, $Na_2O$, and nucleation centers, wherein the reaction mixture has molar ratios of constituents as follows:

| | |
|---|---|
| $Na_2O/SiO_2$ | 0.4–0.9 |
| $SiO_2/Al_2O_3$ | 7–13 |
| $H_2O/Na_2O$ | 30–45, and | wherein the nucleation centers have molar ratios of constituents as follows:

| | |
|---|---|
| $Na_2O/SiO_2$ | 0.5–2.0 |
| $SiO_2/Al_2O_3$ | 10–20 |
| $H_2O/Na_2O$ | 10–40; and | b) heating the reaction mixture to a temperature ranging from 90 to 110° C. for a time period ranging from 23 to 29 hours to obtain the synthetic faujasite zeolite, wherein the synthetic faujasite zeolite has a crystallite size ranging from 1500 to 2000 Å, a particle size ranging from 4000 to 8000 Å, and a retention of surface of more than 70% of that of a parent zeolite, when exchanged with ammonia and subjected to hydrothermal treatment at 650° C. for 3 hours and with 100% steam.

2. The process as claimed in claim 1, wherein nucleation centers are present in the reaction mixture in an amount ranging from 0.1 to 10 weight percent based on the total weight of the reaction mixture.

3. The process as claimed in claim 1, wherein heating takes place at a temperature of 103° C. for 23 hours.

4. A synthetic faujasite zeolite prepared according to the process of claim 1 and having a crystallite size ranging from 1500 to 2000 Å, a particle size ranging from 4000 to 8000 Å, and a retention of surface area of more than 70% of that of a parent zeolite when exchanged with ammonia and subjected to hydrothermal treatment at 650° C. for 3 hours with 100% steam.

5. The synthetic faujasite zeolite as claimed in claim 4, additionally having a molar ratio of silica/alumina of more than 5.2.

6. The synthetic faujasite zeolite as claimed in claim 4, additionally having a crystallinity of more than 97%.

* * * * *